March 9, 1954

L. QUICK 2,671,481

BATCH GLUING MACHINE

Filed June 5, 1951

Inventor:
Lloyd Quick
BY
Harry B. Rook,
Attorney.

March 9, 1954

L. QUICK 2,671,481

BATCH GLUING MACHINE

Filed June 5, 1951

Inventor:
Lloyd Quick
BY
Harry B. Cook,
Attorney.

March 9, 1954 L. QUICK 2,671,481
BATCH GLUING MACHINE
Filed June 5, 1951 7 Sheets-Sheet 4

Inventor:
Lloyd Quick
BY Harry B. Rook,
Attorney.

March 9, 1954 L. QUICK 2,671,481
BATCH GLUING MACHINE
Filed June 5, 1951 7 Sheets-Sheet 5

Inventor:
Lloyd Quick
BY
Harry B. Cook,
Attorney.

March 9, 1954 L. QUICK 2,671,481
BATCH GLUING MACHINE
Filed June 5, 1951 7 Sheets-Sheet 6

Inventor:
Lloyd Quick
BY Harry B. Cook,
Attorney.

March 9, 1954 L. QUICK 2,671,481
BATCH GLUING MACHINE
Filed June 5, 1951 7 Sheets-Sheet 7

Inventor:
Lloyd Quick
BY

Patented Mar. 9, 1954

2,671,481

UNITED STATES PATENT OFFICE 2,671,481

BATCH GLUING MACHINE

Lloyd Quick, Poughkeepsie, N. Y., assignor to James L. Taylor Manufacturing Company, Poughkeepsie, N. Y., a corporation of New York Application June 5, 1951, Serial No. 230,045

12 Claims. (Cl. 144—281)

This invention relates in general to a machine or press for gluing together the edges of boards or strips to produce a large panel or sheet composed of a plurality of such strips firmly glued together.

A prime object of the invention is to provide a machine whereby only one operator can produce such sheets or panels at a high rate while he remains at one station at which the glue coated boards are fed into the machine and the complete glued sheets or panels are discharged from the machine.

Another object is to provide a machine of this character wherein the glue coated boards may be laid up or assembled by the operator at one level, then automatically fed into a heated zone, for example between two heated platens and put under pressure, edge to edge, and then automatically discharged from the machine at another level at which the completed sheets or panels can be removed by the operator or by other suitable means, whereby panels can be produced in rapid succession by a single operator while he stands at one station.

A further object is to provide in such a machine a novel and improved construction and combination of a laying up table and a discharge table at different levels, and two heated platens one of which is vertically movable back and forth between the level of the discharge table and the other platen, and means for operating the tables and said platen so that the glue coated boards can be assembled on the laying up table during the heating and pressing of the next preceding assembled panel, said movable platen is moved to the level of the discharge table and the completed panel is automatically pushed from said platen to the discharge table, after which the laying up table is moved to the level of said movable platen and the freshly assembled boards are fed onto the platen preparatory to the heating and pressing operation between the platens.

Still another object is to provide in a machine of this character, novel and improved automatic means for feeding the assembled boards into the machine and for removing the completed panels from the machine.

A further object is to provide novel and improved means for applying edgewise pressure on the boards which is automatically adjustable to compensate for boards of different thickness.

Other objects, advantages and results of the invention will be brought out by the following description in conjunction with the accompanying drawings in which.

Specifically describing the invention, the character A generally designates the frame of the machine which may be of any suitable construction but is shown as comprising vertical side posts or columns 1 to which are connected lower and upper side bars 2 and 3 at each side of the frame. Mounted on and extending between the upper side bars 3 and also preferably secured to adjacent columns 1 are a pair of transverse top bars 4.

An upper horizontal heating platen or radiator B is shown as suspended from the cross bars 4 and cooperates with a vertically movable heating platen or radiator C to form a space or heating chamber between said platens, the lower platen C being vertically movably mounted on the frame of the machine by means that will be hereinafter described.

These plates or radiators may be of any suitable construction but preferably are made as shown and described in Patent No. 2,580,728 issued January 1, 1952 to Raymond W. Burns and myself. The upper platen B comprises a frame 5 formed of metal channels and secured to the top bars 4 and having a plurality of steam pipes 6 (Figure 8) secured to the lower flanges of the channels and nested between metal T-bars 7 that extend transversely of the platen. Preferably, the pipes and T-bars are welded to each other and to the frame 5, and the heads or cross portions of the T-bars are disposed in the same horizontal plane to form a smooth heating surface. The pipes are connected at their ends to manifolds 8 which are in turn connected to any suitable source of steam supply for heating the platen.

The lower platen is similarly formed, including a frame 9 to which the steam pipes 10 and T-bars 11 are secured and from which depends supplemental side bars 12 in which are journaled horizontal shafts 13 at opposite ends of each of which are gears 14 meshing with racks 15 mounted on the adjacent vertical columns 1. Each side bar has at one side of the frame a roller 16 bearing against the side of one of the vertical columns 1 opposite the corresponding gear 13 to positively guide the platen C in its vertical movement. To ensure uniform movement of both ends of the platen C, preferably there is a chain and sprocket connection 17 between the two shafts 13.

The lower platen C is movable toward and from the upper platen by hydraulic piston and cylinder devices or hydraulic motors D each of which includes a cylinder 18 pivotally mounted at its lower end as at 19 on the main frame and having a piston therein the piston rod 20 of which is connected to the frame 9 of the lower platen. As shown, the platens are rectangular in plan and there is one of the hydraulic motors D mounted adjacent each of the corners of the platen.

With this construction, it will be observed that the lower platen C may be moved upwardly to receive, press and heat between itself and the upper platen, boards to be glued.

At one end of the main frame A is a supplemental frame E on which are mounted a laying up or feed table F and a discharge or take-off table G. As shown, these two tables are disposed in vertically spaced relation with the feed table uppermost, and they are connected, for example by tie pieces 21 to move together. The tables are disposed at one end of the platens B and C and are pivoted on the supplemental frame at their outer ends so that their inner ends may swing simultaneously vertically.

The feed table may be of any suitable construction but is shown as comprising a plurality of bars 22 tied together in spaced and parallel relation by bolts 23 and spacers 24 so that one edge of each bar is in a common substantially horizontal plane with the corresponding edges of the other bars. The outer ends of the bars are pivotally connected to the supplemental frame E as by a pivot rod 25, while the inner ends of the bars are disposed to move about the pivot 25 in substantially a vertical plane closely adjacent one edge of the lower platen C. The tie pieces 21 are shown as connected at one end to the bolts 23 and at the other end to side flanges 26 of a plate 27 that comprises the main portion of the take-off table G so that the take-off table will swing with the feed table F about the pivot pin 25. A plurality of conveyor chains 28 are mounted on sprockets 29 carried by shafts 30 on the plate 27 so that one reach of each chain is slidable along the upper surface of the plate parallel to the other chains for moving the completed panels from the lower platen C to the point of discharge.

The chains are shown as driven by an electric motor 31 through a chain and sprocket connection 32 with one of the shafts 30.

Figure 1:
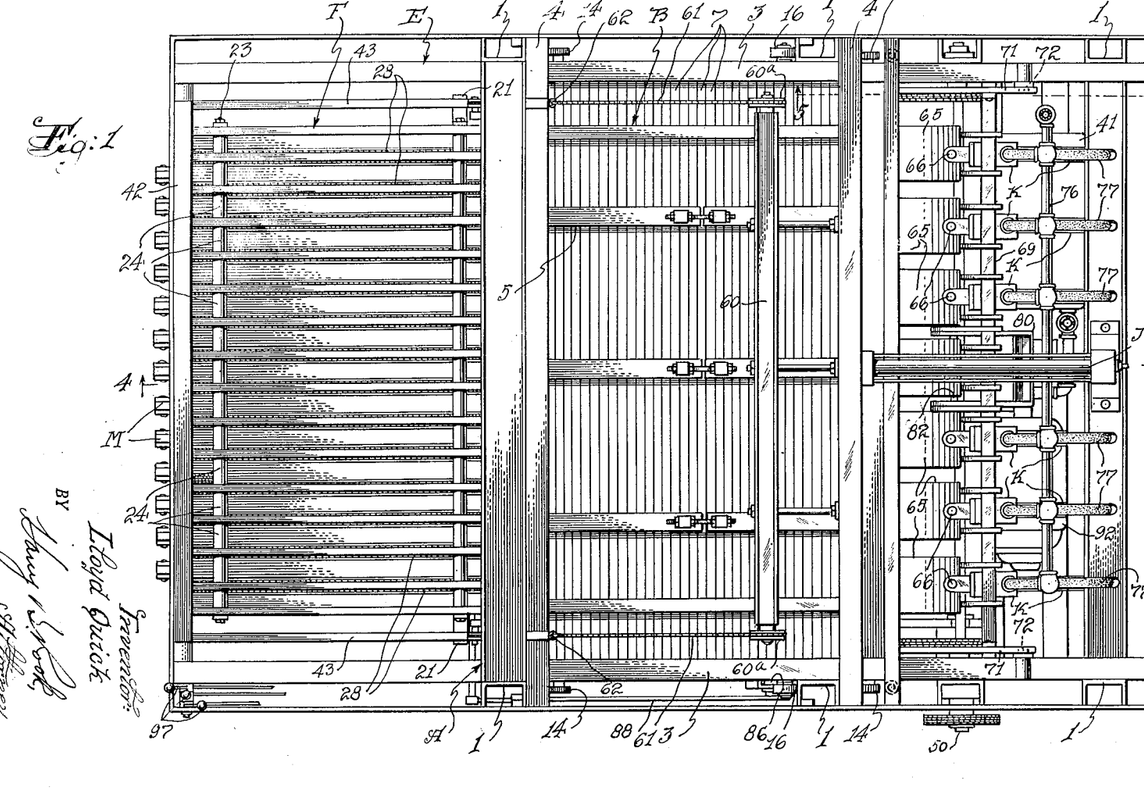
Figure 1 is a top plan view of a batch gluing machine embodying the invention.
Figures 2, 11:
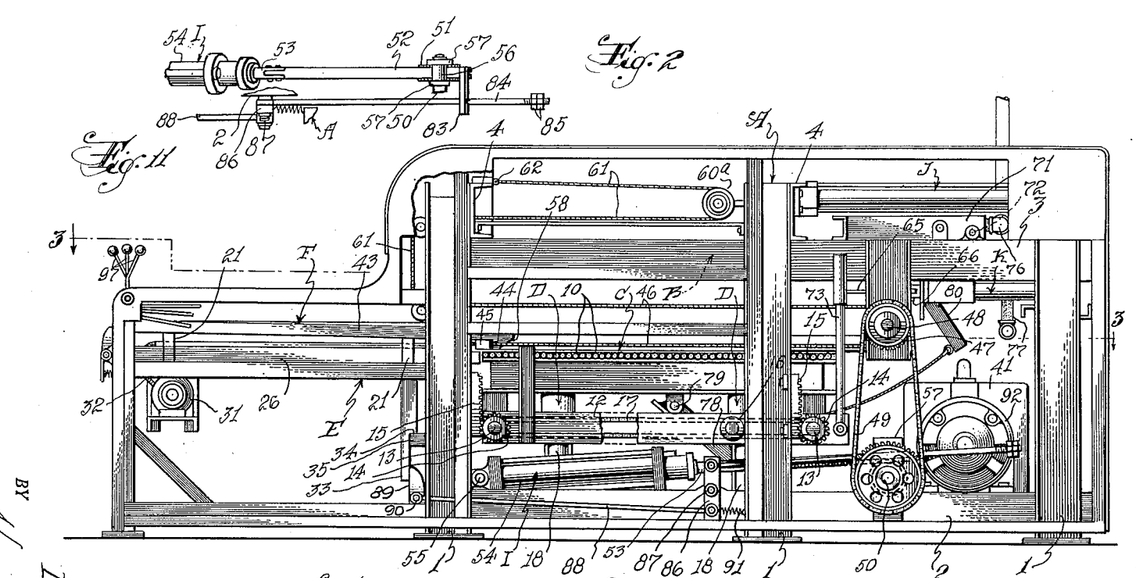
Figure 2 is a side elevational view of the machine with portions broken away for clearness in illustration.
Figure 11 is a top plan view of the parts shown in Figure 9.
Figure 3:
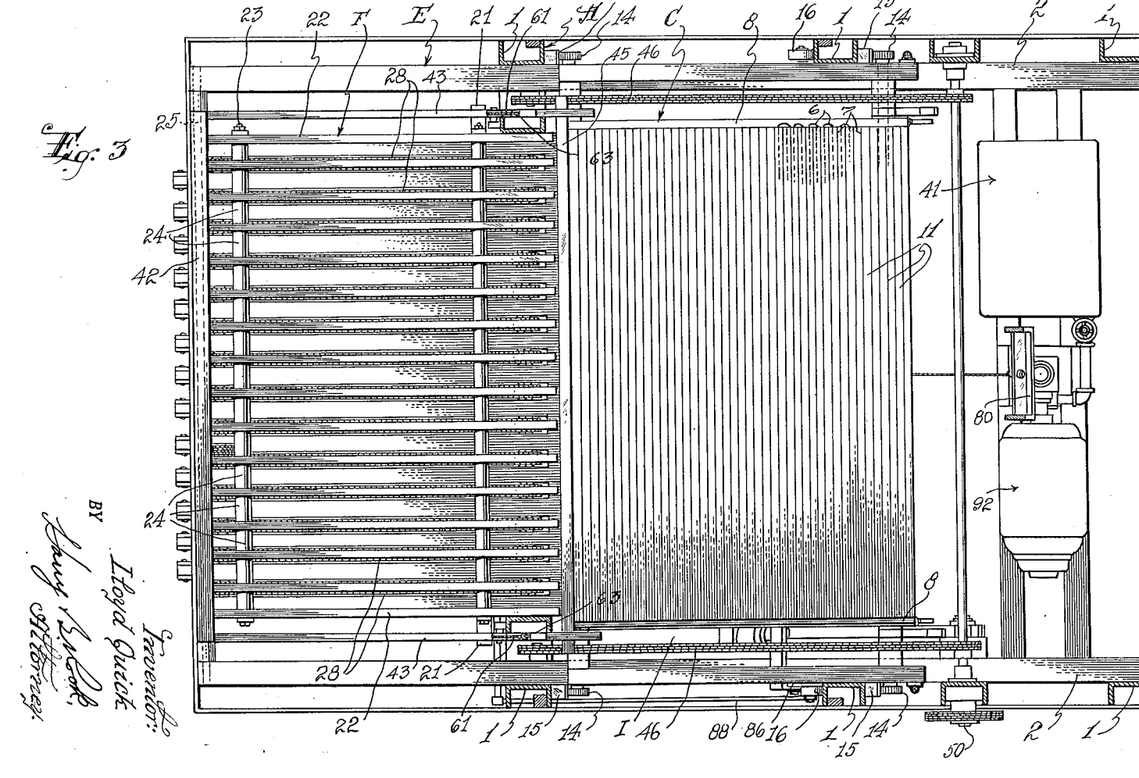
Figure 3 is a horizontal sectional view approximately on the plane of the line 3—3 of Figure 2.
Figures 4, 5, 6, 7, 8:
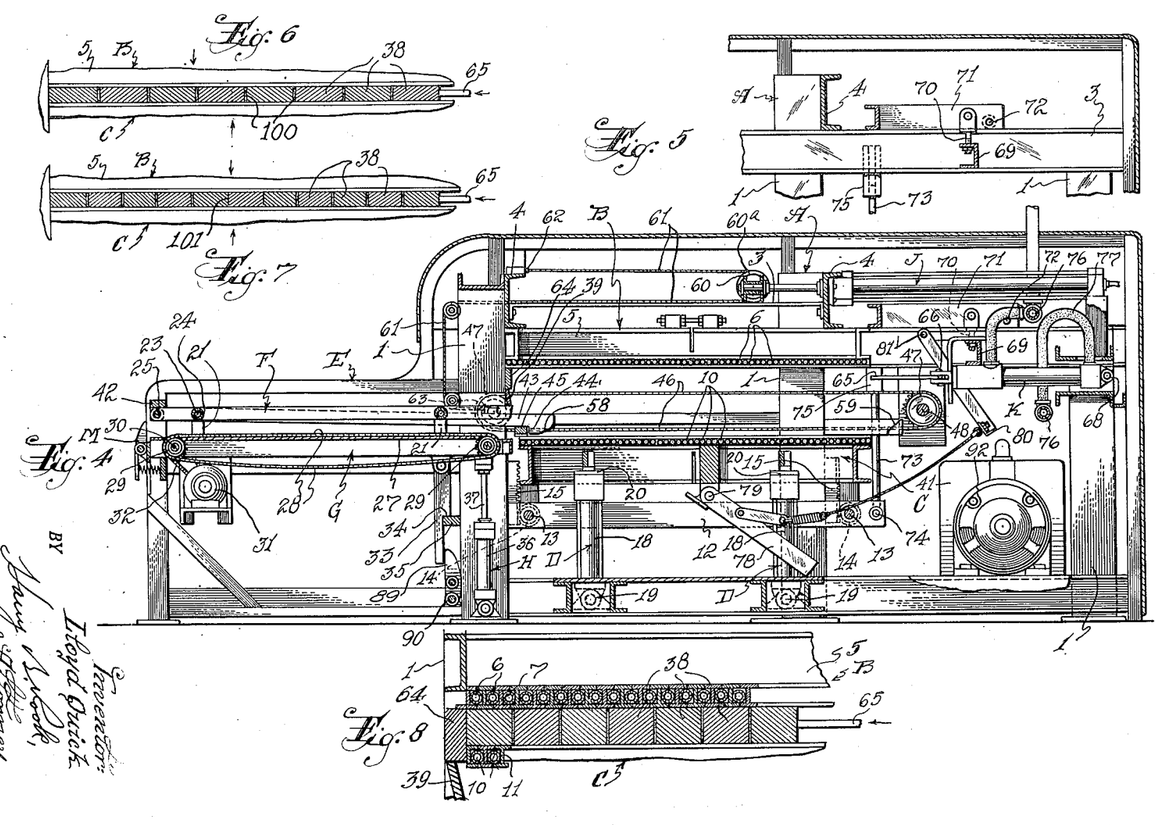
Figure 4 is a vertical longitudinal sectional view approximately on the plane of the line 4—4 of Figure 1.
Figure 5 is a fragmentary vertical sectional view approximately on the plane of the line 5—5 of Figure 1.
Figures 6 and 7 are enlarged vertical sectional views of boards assembled between the platens in different relations.
Figure 8 is a similar view showing boards of a different thickness between the platens.

The feed table and take-off table are normally held in approximately horizontal position with the top of the take-off table in approximately a common plane with the top surface of the lower platen C when the latter is in its lowermost position as shown in Figures 2 and 4, and for so holding the tables a prop 33 has one end pivotally connected to the underside of the take-off table and is provided with a shoulder 34 to seat upon a rest 35 secured on the frame as best shown in Figure 4; and the tables are elevated into that position simultaneously by the hydraulic motor H which includes a cylinder 36 pivotally mounted at one end on the main frame and having a piston the rod 37 of which is pivotally connected to the take-off table G, for example to one of the shafts 30.

Figure 12:
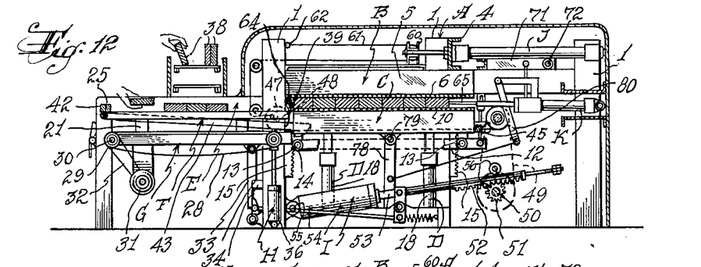
Figures 12 to 19, inclusive, are schematic vertical sectional views on a reduced scale showing the various steps in the operation of the machine.
Figure 16:
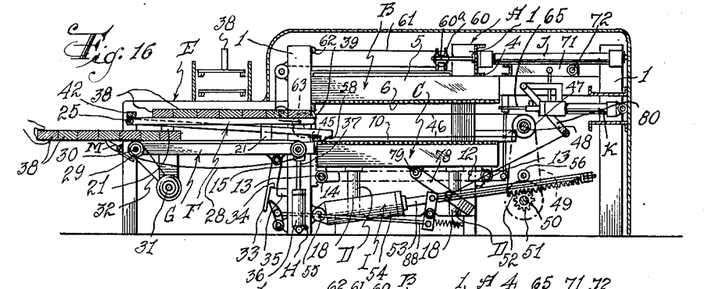
Figure 17:
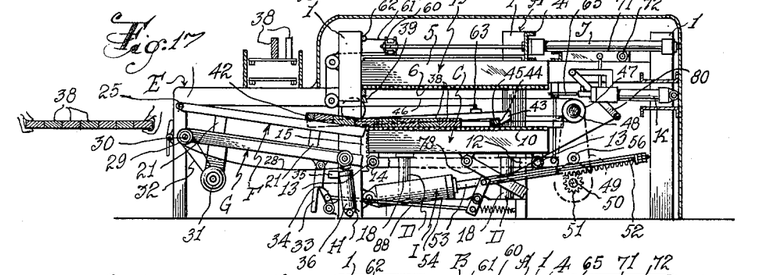

With said tables at the position as described and as shown in Figures 2, 4 and 16, the operator may lay up or assemble boards 38 on the feed table as shown in Figures 12 and 16 to produce a panel of the desired size, the glue coated boards being conveniently supplied to the operator at his station in front of said feed table by a glue applying mechanism such as that shown and described in my co-pending application now Patent No. 2,588,874, dated March 11, 1952. The machine preferably has an abutment bar 39 against which the first board is pushed for lining up the other boards and for preventing the boards from being pushed from the feed table while they are being assembled. The prop 33 is then dislodged from the rest 35 to permit the tables to fall by action of gravity as shown in Figure 17 until the inner end of the feed table is approximately in the same plane with the top surface of the lower platen C, as shown in Figure 17. The hydraulic motor H is vented by a pipe 40 to the reservoir 41 of the hydraulic system which will be hereinafter described (see Figure 20), so that said motor serves as a check or dash-pot to insure a smooth downward swinging of the feed table.

Simultaneously the boards are pushed from the feed table by a pusher that comprises a bar 42 to abut the last board 38 on the feed table and having at its ends spaced and parallel arms 43 the extremities of which have hooks 44 to engage a pull bar 45 mounted on and between the lower reaches of two parallel chains 46 which run around sprockets 47 carried by shafts 48 on the main frame. One of these shafts 48 is extended and has a chain and sprocket connection 49 with a suitable shaft 50 journaled on the main frame and having thereon a pinion 51 with which meshes a rack bar 52 that is connected to the piston rod 53 of a hydraulic motor I which includes a cylinder 54 pivotally mounted at one end as at 55 on the main frame. A guide roller 56 is mounted on an arm 57 pivoted on the shaft 48 so that the roller engages the back of the rack bar opposite the pinion 51. As the rack bar 52 is moved to the left in Figure 17, the pull bar engages the hooks 44 as shown in Figures 4 and 16 and the pull bar is moved by the chains 46 to the right across the upper surface of the lower platen C, thereby drawing the pusher bar 42 inwardly of the machine so as to push the board off the feed table onto the lower platen as shown in Figure 17. As the pull bar reaches the limit of its movement in said direction, that is, when all of the boards have been moved onto the platen, beveled surfaces 58 on the arms 43 engage beveled surfaces 59 on the main frame so as to lift the pusher arms 43 out of engagement with the pull bar, whereupon the pull bar is returned to its initial position as shown in Figure 16 by a single acting hydraulic motor J the piston rod of which is connected to a bar 60 that carries sprockets 60a at each side of the machine around which pass the chains 61 one end of each of which is connected to the main frame at 62 while its other end is connected at 63 to the pusher arm 43.

Figure 18:
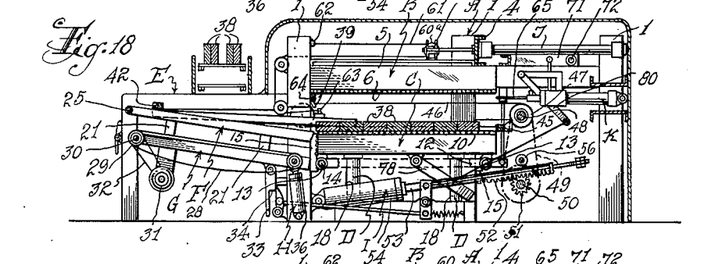
Figure 19:
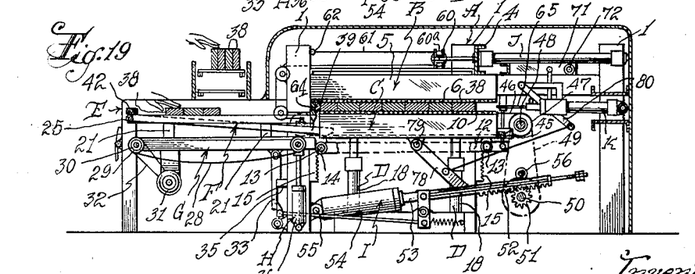

The lower platen is then elevated by the hydraulic motor D to grip the boards between the lower and upper platens as shown in Figure 19, the pull bar 45 remaining at the right hand side of the platens as shown in Figures 18 and 19. The boards are then subjected to edge pressure, the board at one edge of the panel engaging an abutment 64 and the board at the opposite edge of the panel being engaged by a series of pressers 65 each of which is shown as connected at 66 to the piston rod 67 of a double acting hydraulic motor K. The motors K are pivotally connected at one end 68 to the main frame to swing in vertical planes and are rigidly connected by a tie bar 69 which is vertically adjustable so as to raise and lower the pusher plates 65 in accordance with variations in thickness of the boards between the platens. As shown, the tie bar 69 is connected at its ends by adjusting bolts 70 that are in turn pivotally connected to a U-shaped frame 71 which is pivotally connected at one end at 72 on the main frame. Beneath the swinging end of the frame 71 are vertical rods 73 one at each side of the machine and having one end pivotally connected at 74 to the corresponding auxiliary side bar 12 of the lower platen frame and its other end vertically slidable in a guide tube 75 so that as the lower platen rises, the rods 73 will engage the frame 71 and swing it to adjust the pusher plates 65 vertically and locate them centrally of the thickness of the boards as best shown in Figures 6, 8 and 12, it being understood that the length of the rod and the position of the presser plates will initially be set for boards of the greatest thickness. The hydraulic pressure is supplied to the motor K through manifold pipes 76 and flexible hoses 77.

As the lower platen reaches its uppermost position, a safety prop 78 is released into position to prevent unintended dropping of the lower platen should the hydraulic pressure be unintentionally relieved from the motors D. This prop is pivotally connected at one end to the frame of the lower platen and its other end is adapted to engage the floor or some rigid portion of the main frame of the machine when the prop is in substantially vertical position as shown in Figure 12. The proper is normally held in an out of the way position as shown in Figures 4 and 13 by a U-shaped level 80 the arms of which are pivoted at 81 on the main frame and are engaged by lugs 82 on certain of the presser plates 65 when the latter are in their normal or release positions as shown in Figures 4 and 16; and the prop is released into operative position simultaneously with the movement of said presser plates into board-pressing position as shown in Figure 12.

Figure 14:
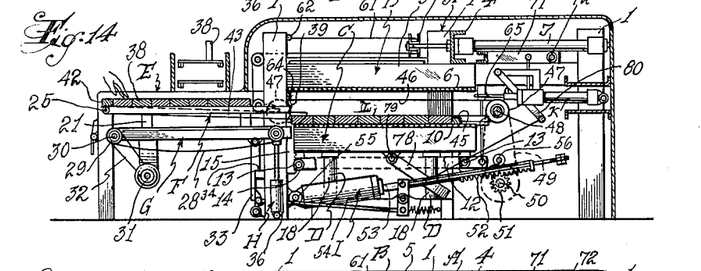
Figure 15:
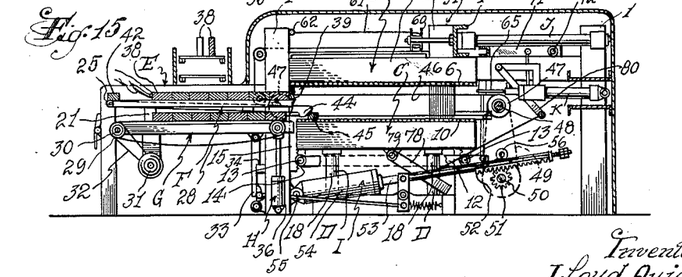

After the glue between the boards has become sufficiently set, the lower platen is lowered to its initial position as shown in Figure 14 and the motor I is operated to move the rack bar 52 to the right and thereby actuate the pull bar 45 to the left and into engagement with the adjacent edge of the completed panel L as shown in Figure 14 so as to push said panel off the platen and onto the feed table as shown in Figure 15, from which the panel may be removed by the operator as shown in Figure 17 or in any other suitable way. The pull bar then engages the beveled ends of the pusher arms 43 as shown in Figure 15 in readiness for the feeding of another assembly of boards into the machines.

Figure 9:
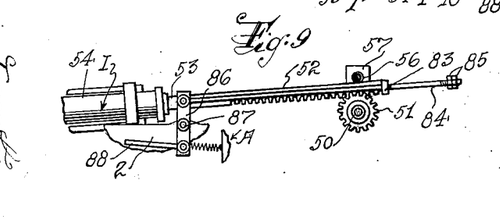
Figures 9 and 10 are fragmentary side elevational views of portions of the driving mechanism for feeding the assembled boards into the machine and for pushing the complete panels out of the machine, the parts being shown in different positions.
Figure 10:
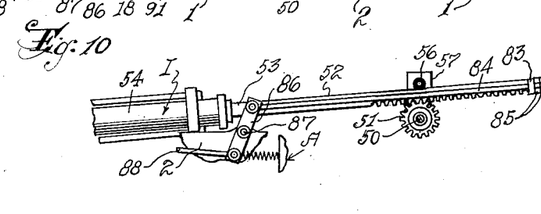
Figure 13:
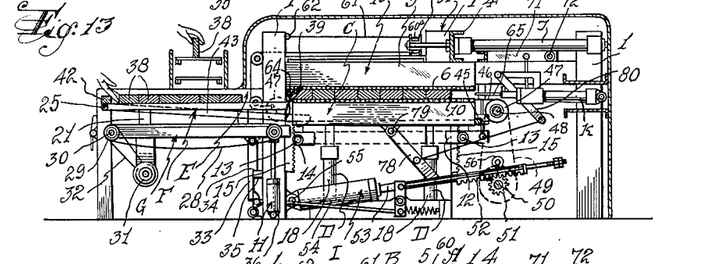

During the drying and pressing of the panel, the next succeeding set of boards will have been laid up on the feed table by the operator as shown in Figures 12 and 13, and just before the pull bar has reached its normal position, the rack bar 52 will actuate the mechanism for disengaging the prop 33 to release the feed and take-off tables for downward movement. For so releasing the prop, the rack bar is shown as provided with an arm 83 (Figs. 9, 10, 11) which has an opening through which is slidable a rod 84 having at one end adjustable stop nuts 85 and connected at its other end to one end of a lever 86 which lever is pivotally mounted intermediate its ends as at 87 to the main frame and is connected at its other end to one end of a rod 88. Rod 88 is connected at its other end to a dog or latch 89 that is pivotally mounted at 90 on the main frame and is normally disposed at the same side of the prop 33 as the rest 35. The lever 86 is normally influenced by a tension spring 91 to hold the latch 89 in position to permit the shoulder 34 of the prop to engage the rest 35 as best shown in Figures 2 and 12, and when the arm 83 engages the nuts 85, the lever 86 and latch 89 are actuated to push the prop out of engagement with the rest as shown in Figure 17, thereby permitting the tables F and G to drop so that the assembled boards may be fed from the feed table onto the lower platen as shown in Figure 17.

Thereupon the operation of the machine is repeated as hereinbefore described.

Figure 20:
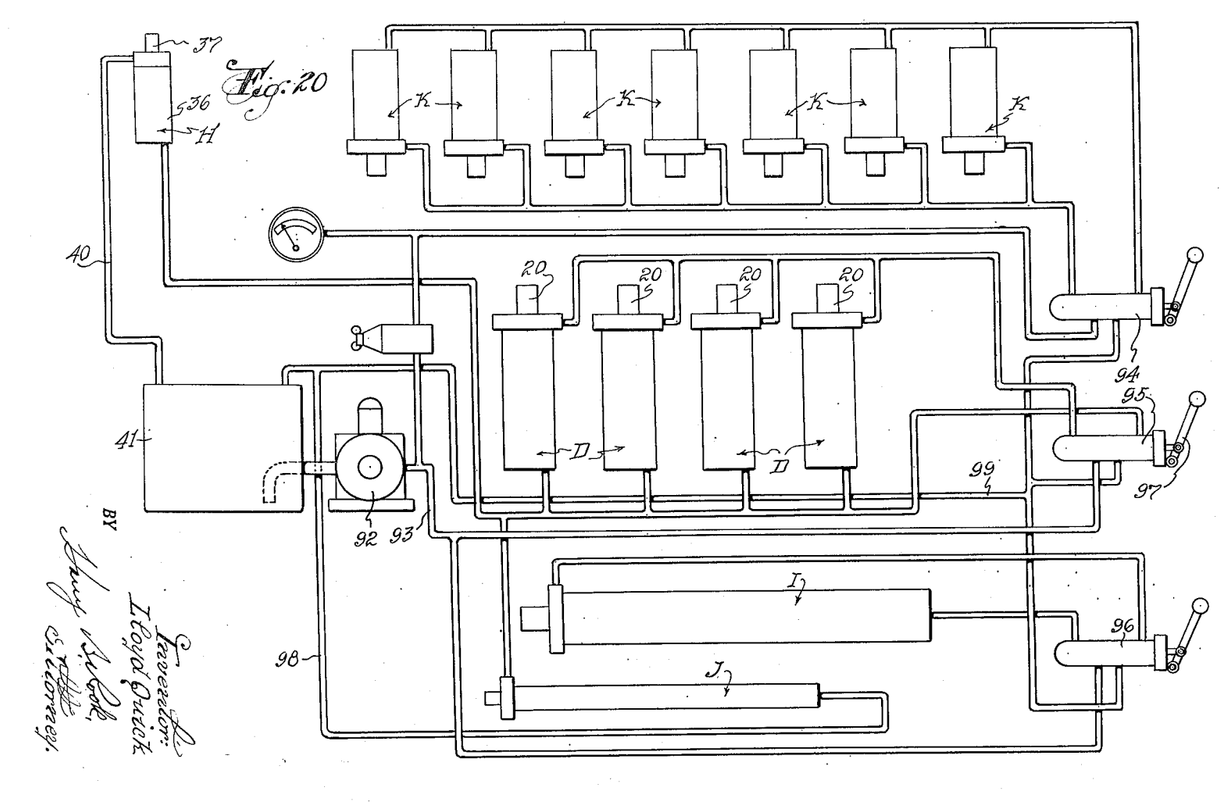
Figure 20 is a schematic or diagrammatic view of the fluid pressure system.

It will be understood by those skilled in the art that the various hydraulic motors will be operated in proper timed relation to each other and that any suitable hydraulic pressure producing and control system may be utilized. For ideal operating conditions, suitable cams would be utilized for controlling the valves for the hydraulic motors, but in Figure 20 is shown schematically a simplified manually controlled system which includes a pump 92 associated with the reservoir 41 and having a manifold outlet 93 which is connected to the respective valves 94, 95 and 96 for the respective motors K, H, D and J and I, each valve having a hand lever 97 pivotally mounted in convenient relation to the operator's station. The valve 94 controls the double acting motors D while the valve 95 controls the double acting motors D and the single acting motors H and J so that the latter is operated only in one direction under pressure simultaneously with the operation of the motors D in one direction and is operated in the other direction by gravitational action on the feed tables, the pressure being relieved through the vent 40.

The motor J is operated in one direction simultaneously with the motor D and in the other direction by the pull bar 45 during the feeding of the boards into the machine, pressure being vented from one end of the motor J through the vent pipe 98. The valve 96 controls the motor I alone. The three valves 94, 96 and 97 have a common return or vent 99 to the reservoir, and it will be understood that the valves are of such construction that they will admit pressure to one end of the corresponding motors and relieve pressure from the other end.

Desirably spring actuated stops M are mounted at the exit end of the discharge table to stop movement of each completed panel by the conveyor chains 28 until the next succeeding complete panel is ejected by the pull bar 47, the stops yielding outwardly to release the completed panel as shown in Figure 16. This gives the operator ample time to remove the complete panels from the machine.

It will be understood that instead of having the abutting edges of all of the boards glue coated, as shown for example at 100 in Figure 6, the glue may be omitted from some of the boards as indicated at 101 in Figure 7 so that the unglued boards will not be fastened together and two or more panel sections can be produced at the same time.

From the foregoing, it will be seen that the invention provides a machine which can be operated by a single operator from a single station at which the operator can lay up the boards for one panel while another panel is being heated and pressed and the freshly laid up panel can be automatically fed into the machine immediately following the discharge of the next preceding complete panel. The invention thus provides a higher rate of production of panels than has been heretofore possible by a single machine with a single operator.

Those skilled in the art will readily understand that many modifications and changes can be made in the construction and operation of the machine within the spirit and scope of the invention and particularly that the lower platen could be fixed and the upper platen movably mounted, and that the feed and discharge tables might be linearly vertically movable instead of swingable as shown. Furthermore, both platens may be movable and the work-feed and work-discharge tables may be stationary to provide for laying up a new batch of work at one level on the feed table and to receive a preceding or complete batch of work from between said platens on said discharge table at another level.

I claim:

1. A gluing machine comprising a frame, an upper fixed platen and a lower platen vertically movable toward and from the upper fixed platen to receive and release work between them respectively, means for moving said lower platen up and down, a presser projectible and retractible to press and release the edge of work between said platens, said presser being mounted on said frame for vertical movement and there being adjustable support means on said frame adjacent said platens for holding said presser at a predetermined vertical position with respect to said frame so that with work of a given thickness said presser will engage the edge of the work centrally of its thickness, means carried by said lower platen and abutting said support means upon elevation of said lower platen to move said presser upwardly when work of less thickness is disposed between the platens, and actuating means connected to the presser for actuating said presser into and out of engagement with said work.

2. A gluing machine as defined in claim 1 wherein said support means includes a lever mounted at one end on said frame pivotally and adjustably connected intermediate its ends to said presser, and said means carried by the platen includes a vertical rod engageable with the free end of said lever upon elevation of said lower platen.

3. A gluing machine comprising a lower platen and an upper platen relatively movable together and apart to engage and release work between them respectively, a work feed table and a work discharge table located one above the other which tables are connected together and are movable together to one position in which an edge of the work feed table lies substantially opposite one edge of the lower platen permitting the transfer of work from the work-feed table to the lower platen, and to another position in which an edge of the work discharge table lies substantially opposite said one edge of the lower platen permitting the transfer of work from the lower platen to the discharge table, and means operatively connected with said tables for controlling movement thereof to said one or another position.

4. A gluing machine as defined in claim 3 wherein said means for controlling movement of the tables includes mechanism for moving the tables in one direction as the platens move together and for moving the tables in the opposite direction while the platens are apart.

5. A gluing machine as defined in claim 3 with the addition of a pusher on the work-feed table engageable behind work on the table to push work therefrom onto the lower platen, and a pull bar movable across the upper surface of the lower platen and engageable with work thereon to move such work from the lower platen onto the discharge table.

6. A gluing machine as defined in claim 3 with the addition of a pusher on the work-feed table engageable behind work thereon for pushing the work from the feed table onto the lower platen, a pull bar movable across the upper surface of the lower platen and automatically releasably engageable with said pusher at the work receiving edge of said lower platen to actuate said pusher in the direction to feed the work onto the platen and automatically disengageable from said pusher at the opposite edge of said lower platen, means operatively connected to the pusher for actuating the pusher in the opposite direction, and means connected with the pull bar for moving the pull bar in a direction to actuate the pusher for feeding work onto the lower platen and for moving the pull bar in the opposite direction, the pull bar being engageable upon movement in said opposite direction with work on the lower platen to move it therefrom and onto the work discharge table.

7. A gluing machine as defined in claim 3 wherein the tables are hingedly mounted at one end to swing together, the tables being movable about their pivoted ends to said one or another position.

8. A gluing machine as defined in claim 3 wherein said upper platen is fixed and said lower platen is vertically movable toward and from the fixed platen, and said tables are hingedly mounted at one end to swing together, the tables being movable about their pivoted ends to said one or another position.

9. A gluing machine as defined in claim 3 wherein the tables are hingedly mounted at one end to swing together, the tables being movable about their pivoted ends to said one or another position; and said means for controlling movement of the tables includes a hydraulic motor suitably connected thereto for swinging the tables upwardly into said another position as the platens move together, and a movable prop also connected to the said tables for temporarily holding the tables in said another position and for causing swinging of the tables into said one position after the platens move apart.

10. A gluing machine as defined in claim 3 wherein said upper platen is fixed and said lower platen is vertically movable toward and away from the fixed platen; and the tables are hingedly mounted at one end to swing together, the tables being movable about their pivoted ends to said one or another position; and said means for controlling movement of the tables includes a hydraulic motor suitably connected thereto for swinging the tables upwardly into said another position as the lower platen moves upwardly, and a movable prop also connected to the said tables for temporarily holding the tables in said another position and for causing downward swinging of the tables into said one position while the lower platen is moved away from the fixed platen.

11. A gluing machine as defined in claim 3, wherein said upper platen is fixed and said lower platen is vertically movable toward and from the fixed platen, and said tables are hingedly mounted at one end to swing together, the tables being movable about their pivoted ends to said one or another position; and said means for controlling movement of the tables includes a hydraulic motor suitably connected thereto for swinging the tables upwardly into said another position as the lower platen moves upwardly, and a movable prop also connected to the said tables for temporarily holding the tables in said another position and for causing downward swinging of the tables into said one position while the lower platen is moved away from the fixed platen; and with the addition of a pusher on the work-feed table engageable behind work thereon for pushing the work from the feed table onto the lower platen, a pull bar movable across the upper surface of the lower platen and automatically releasably engageable with said pusher at the work receiving edge of said lower platen to actuate said pusher in the direction to feed the work onto the platen and automatically disengageable from said pusher at the opposite edge of said lower platen, means operatively connected to the pusher for actuating the pusher in the opposite direction, and means connected with the pull bar for moving the pull bar in a direction to actuate the pusher for feeding work onto the lower platen and for moving the pull bar in the opposite direction, the pull bar being engageable upon movement in said opposite direction with work on the lower platen to move it therefrom and onto the work discharge table.

12. A gluing machine comprising a lower platen and an upper platen relatively movable together and apart to engage and release work between them respectively, a work feed table and a work discharge table located one above the other at the same side of the platens with one edge of the work discharge table opposite one edge of the lower platen when said platens are apart, and mechanism for causing relative vertical movement of said tables and said platens such that at one time an edge of the work feed table is located substantially opposite one edge of the lower platen permitting the transfer of the work from the work feed table to the lower platen and at another time an edge of the work discharge table lies substantially opposite said one edge of the lower platen permitting the transfer of work from the lower platen to the discharge table.

LLOYD QUICK.

References Cited in the file of this patent

UNITED STATES PATENTS

| Number | Name | Date |
|---|---|---|
| 663,847 | Bancroft | Dec. 18, 1900 |
| 2,084,980 | Sweeney | June 22, 1937 |
| 2,127,278 | Welch | Aug. 16, 1938 |
| 2,191,070 | Cone | Feb. 20, 1940 |
| 2,390,159 | Laucks et al. | Dec. 4, 1945 |
| 2,488,759 | Bolling | Nov. 22, 1949 |
| 2,526,342 | Frisch | Oct. 17, 1950 |